(12) United States Patent
Dennison (10) Patent No.: US 10,690,527 B2
(45) Date of Patent: Jun. 23, 2020

(54) GAS FLOWMETER

(71) Applicant: William E. Dennison, Mentor, OH (US)

(72) Inventor: William E. Dennison, Mentor, OH (US)

( * ) Notice: Subject to any disclaimer, the term of this patent is extended or adjusted under 35 U.S.C. 154(b) by 82 days.

(21) Appl. No.: 15/587,097

(22) Filed: May 4, 2017

(65) Prior Publication Data

US 2017/0322058 A1 Nov. 9, 2017

Related U.S. Application Data

(60) Provisional application No. 62/331,577, filed on May 4, 2016.

(51) Int. Cl.
*G01F 1/22* (2006.01)
*G01F 15/00* (2006.01)
*G01F 15/14* (2006.01)

(52) U.S. Cl.
CPC .............. *G01F 1/22* (2013.01); *G01F 15/005* (2013.01); *G01F 15/14* (2013.01)

(58) Field of Classification Search
CPC ................................ G01F 1/22–26; G01F 7/00
See application file for complete search history.

(56) References Cited

U.S. PATENT DOCUMENTS

| | | | | |
|---|---|---|---|---|
| 1,227,842 A * | 5/1917 | Sellin | ................. | G01P 13/0013 116/273 |
| 1,889,705 A * | 11/1932 | Sherwood | ................. | G01F 1/22 116/273 |
| 1,899,764 A * | 2/1933 | Machlet | .................... | G01F 1/22 73/861.55 |
| 1,965,333 A * | 7/1934 | Connell | .................... | G01F 1/22 73/861.57 |
| 2,130,981 A * | 9/1938 | Fischer | .................... | G01F 1/22 73/328 |
| 2,252,883 A * | 8/1941 | Everson | .................... | G01F 1/22 73/861.66 |
| 2,258,023 A * | 10/1941 | McKernon | ................ | G01F 1/22 73/861.55 |
| 2,370,634 A * | 3/1945 | Brewer | ..................... | G01F 1/22 73/201 |
| 2,404,361 A * | 7/1946 | Brewer | ..................... | G01F 1/22 73/861.55 |

(Continued)

FOREIGN PATENT DOCUMENTS

BE 1007562 A6 * 8/1995 ............... G01F 1/22

OTHER PUBLICATIONS

English Translation of BE-1007562-A6, Aug. 1995.*

(Continued)

*Primary Examiner* — Alexander A Mercado
(74) *Attorney, Agent, or Firm* — Fay Sharpe LLP (57) ABSTRACT

A gas flowmeter and associated method of forming a glass flowmeter includes a body having a passage that communicates with an inlet and an outlet for receiving gas flow therethrough. A selectively variable valve controls a flow of gas to the outlet, and plural calibrated scales are operatively associated with the passage to represent a flow rate of gas through the passage. First and second floats having different material properties are received in the passage and are viewable in operative association with the calibrated scales.

10 Claims, 13 Drawing Sheets

(56) References Cited

U.S. PATENT DOCUMENTS

| | | | | |
|---|---|---|---|---|
| 2,426,263 | A * | 8/1947 | Fischer | G01N 11/105 73/54.11 |
| 2,426,393 | A * | 8/1947 | Fischer | G01N 11/105 73/54.13 |
| 2,437,247 | A * | 3/1948 | Fischer | G01N 9/12 73/32 R |
| 2,439,614 | A | 4/1948 | Schramm | |
| 2,490,792 | A * | 12/1949 | Fischer | G01F 1/22 73/861.57 |
| 2,655,041 | A * | 10/1953 | Jacobsson | G01F 1/22 137/544 |
| 2,707,879 | A * | 5/1955 | Dwyer | G01F 1/22 55/DIG. 34 |
| 2,778,223 | A * | 1/1957 | Kimbrell | G01F 1/22 137/557 |
| 2,800,019 | A | 7/1957 | Rumble | |
| 2,993,374 | A * | 7/1961 | Dwyer | G01F 1/22 73/861.55 |
| 3,720,109 | A * | 3/1973 | Blechman | G01F 1/22 73/864.35 |
| 3,751,971 | A * | 8/1973 | Wilcox | G01B 13/02 73/37.9 |
| 3,805,611 | A * | 4/1974 | Hedland | G01F 1/26 73/861.58 |
| 4,194,386 | A * | 3/1980 | Waters | G01F 1/22 29/407.05 |
| 4,245,513 | A * | 1/1981 | Clements | G01F 1/22 73/861.55 |
| 4,281,554 | A * | 8/1981 | Rosaen | G01F 1/28 73/861.71 |
| 4,317,375 | A * | 3/1982 | Egert | G01F 1/22 137/68.11 |
| 4,562,863 | A * | 1/1986 | Claussen | A01C 7/102 137/557 |
| 4,873,872 | A * | 10/1989 | Wechsler | G01F 1/22 73/861.57 |
| 4,899,582 | A * | 2/1990 | O'Dougherty | F04B 51/00 73/168 |
| 5,186,058 | A * | 2/1993 | Lew | G01D 5/06 73/861.56 |
| 5,398,721 | A * | 3/1995 | Pryor | G01F 1/22 137/505.25 |
| 5,402,686 | A * | 4/1995 | Wittmann | B29C 45/7306 73/861.55 |
| 6,212,957 | B1 * | 4/2001 | McCombs | G01F 1/22 73/1.33 |
| 6,539,814 | B1 * | 4/2003 | Popp | G01F 1/22 73/861.56 |
| 6,799,478 | B1 * | 10/2004 | Oppenheimer | G01P 5/02 73/861.57 |
| 2009/0000395 | A1 * | 1/2009 | Brown | G01F 1/28 73/861.47 |

OTHER PUBLICATIONS

FM-1050 Series High Accuracy Flowmeter (150 mm Reference), Brass. (n.d.). Retrieved Nov. 22, 2015, from http://store.mathesongas.com/fm-1050-series-high-accuracy-flowmeter-150-mm-reference-brass/.*
Appendix: Collection of Documents from mathesongas.com pertaining to FM-1050, Retrieved 1991.*
Appendix: Updated Collection of Documents retrieved from mathesongas.com pertaining to FM-1050, Retrieved 1991.*
PCT/US17/31107 International Search and Written Opinion, dated Aug. 4, 2017.
ESAB, "L-32 Flowmeter", undated, p. 63.
EP 17 79 3365 Extended European Search Report, dated Nov. 14, 2019.

* cited by examiner

GAS FLOWMETER

This application claims the priority benefit of U.S. provisional application Ser. No. 62/331,577, filed May 4, 2016, the entire disclosure of which is expressly incorporated herein by reference.

BACKGROUND

This invention relates to a flowmeter device capable of monitoring the flow of different compressed gases (e.g., two, three, or four gases) supplied from pressurized cylinders, pipelines, and other containers in the welding industry.

Welding equipment, such as MIG and TIG welders, require a supply of shielding gas. Common shielding gases are carbon dioxide, argon, nitrogen, and helium. It is important to control the appropriate flow rate of these gases, depending on the application, to ensure an efficient and quality weld. The flow rate is controlled using a flowmeter that includes a variable orifice control valve. The resulting amount of flow is calculated using a variable area meter, commonly called a rotameter. The rotameter includes a float inside a transparent tapered tube and a scale. The height of the float on the scale displays the rate of gas flow.

Typically, flowmeters have scales calibrated for one, or perhaps two different gases. When a welder needs to change the shielding gas, they need to either change flowmeters or calculate flow rate using a correction factor. Either method adds time and cost to the welding process.

Flowmeters can be made to function in two different ways, namely pressure compensated and non-compensated. Pressure compensated flowmeters are calibrated based upon a set pressure (e.g., a user can select 50 PSI is the set pressure) with the flow being adjusted with a variable orifice, e.g., needle valve. In MIG or TIG welding, the operator uses either a MIG gun or a TIG torch. Both the MIG gun and the TIG torch use inert shielding gases such as the shielding gases noted above (carbon dioxide, argon, nitrogen, and helium) or mixtures thereof. The flow of these shielding gases is normally controlled by the operator via an electric solenoid. Therefore, anytime the shielding gases are not flowing, the pressure in the lines builds to the set pressure (e.g. 50 PSI). Each time the operator energizes the solenoid, shielding gas starts to flow with a large surge of pressure until the pressure drops to whatever is necessary (can be as low as 1 to 2 psi) for the shielding gas to flow through the orifice at the desired flow rate that has been initially set by the operator. The operator can stop and start the solenoid dozens and sometimes hundreds of times per day. This surge wastes huge quantities of gas.

With non-compensated flowmeters, the shielding gas flows through a fixed orifice with the flow rate being adjusted by changing the regulator pressure. The result is that there is little or no surge. Some time ago, a small regulator was added to the outlet of the compensated flowmeter. With the small regulator added to the outlet, all the operator had to do was to open the needle valve to its maximum and set the flow rate by adjusting the small regulator pressure setting. By doing this, the customer could reduce inert shielding gas consumption by as much as 60%.

To this day, pressure compensated designs are still the most popular. Most manufacturers, however, offer flowmeters with a reduced preset pressure so that the flowmeters are less wasteful. Unfortunately there are drawbacks to the non-compensated and lower pressure designs. For example, there can be gas flow issues with extra long welding cables, or when working outside in the elements.

A need exists for an improved gas flowmeter that addresses one or more of the above-noted deficiencies in an economical, simple to use manner.

SUMMARY

This invention improves on the prior art by incorporating different scales for multiple, common shielding gases in a single flowmeter.

The flowmeter of the present application can be produced in either pressure compensated and non-compensated versions. Moreover, the flowmeters can be calibrated over a wide range of set pressures, e.g. from about 15 psi to 80 psi).

The pressure compensated versions of the present disclosure can be made with calibrated scales with different units of measurement. For example, the scales could be calibrated in liters per minute for international use outside the US, while the more common scale use in the US is a calibrated scale measured in cubic feet per hour.

Also be recognize that any custom calibrated scale can be provided for special mixed inert gases Benefits and advantages of the present disclosure will become more apparent from reading and understanding the following detailed description.

DETAILED DESCRIPTION

Figure 1:
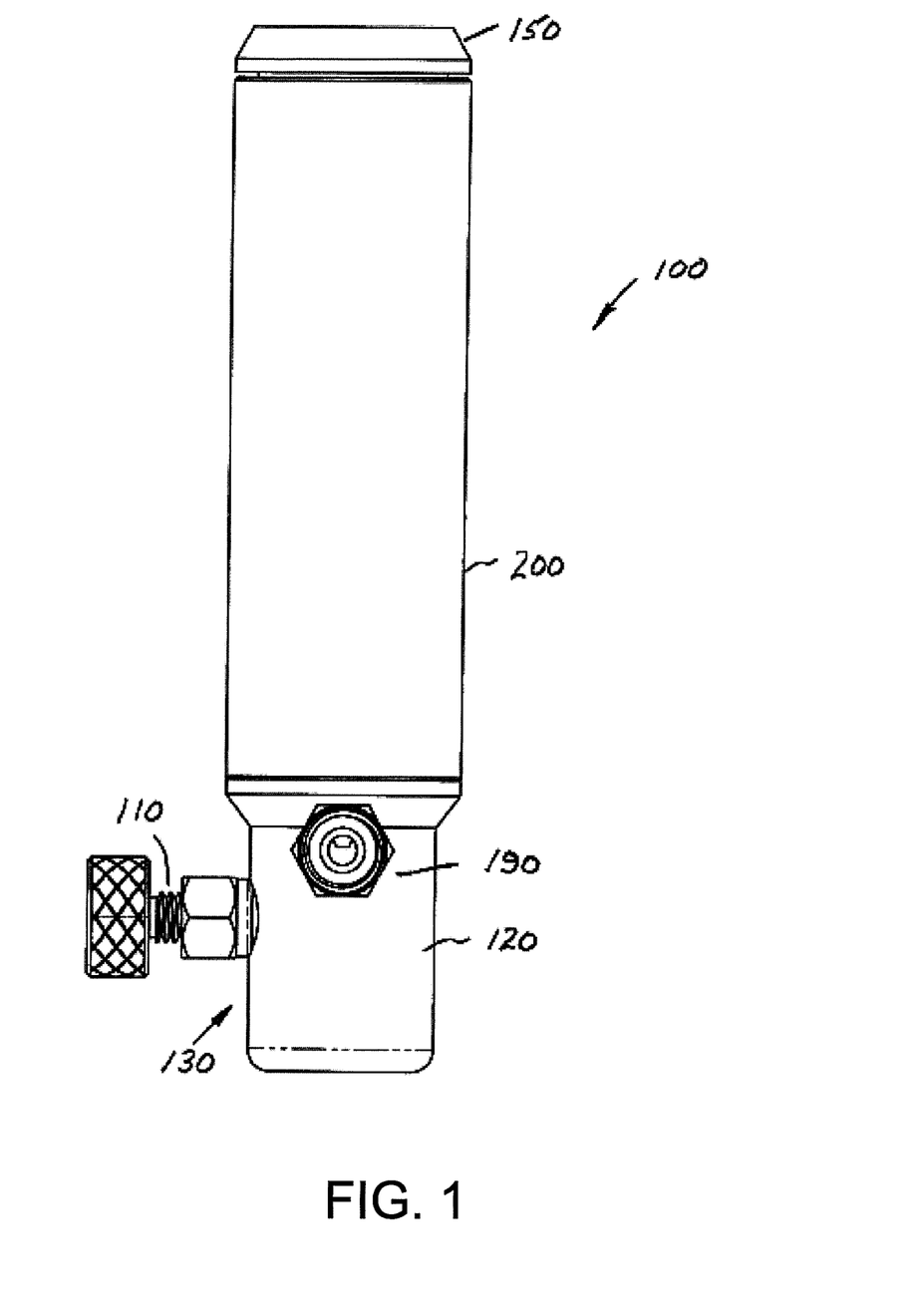
FIG. 1 is an elevational view of a flowmeter assembly.
Figure 2:
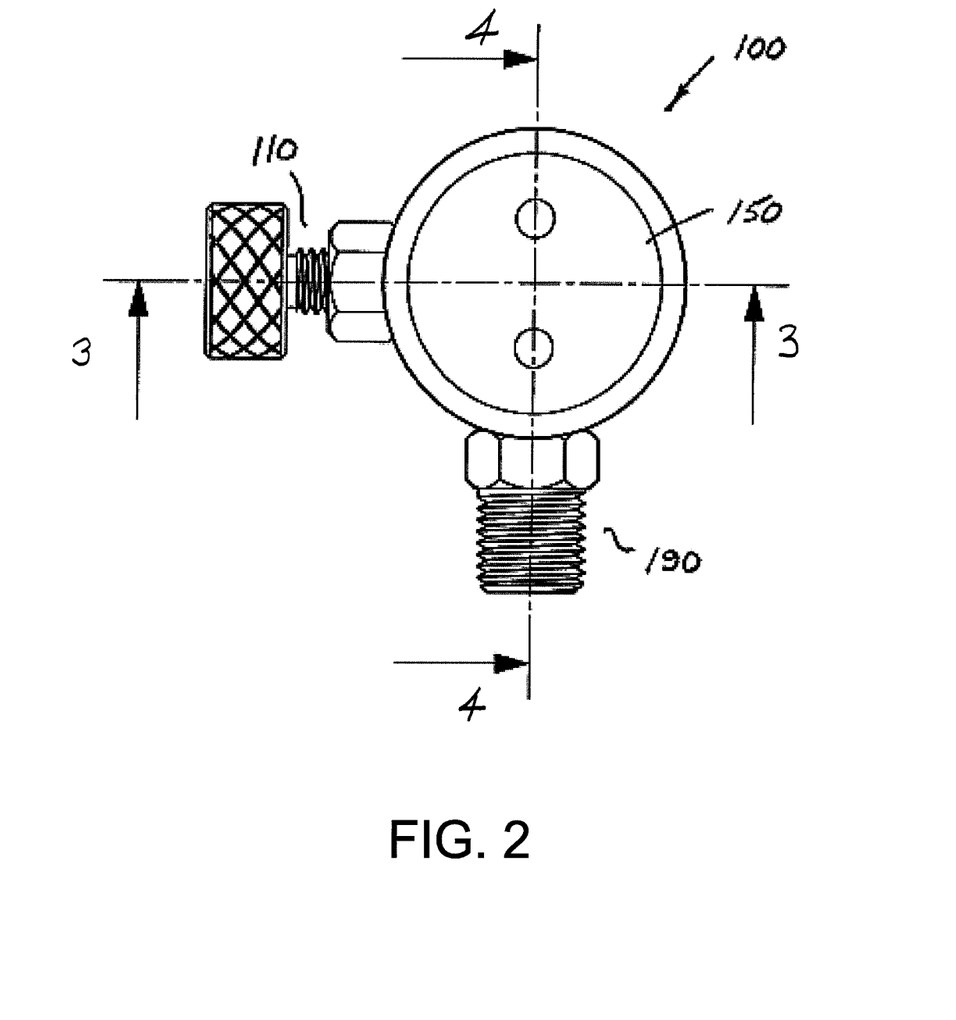
FIG. 2 is a top plan view of the flowmeter assembly of FIG. 1.
Figure 3:
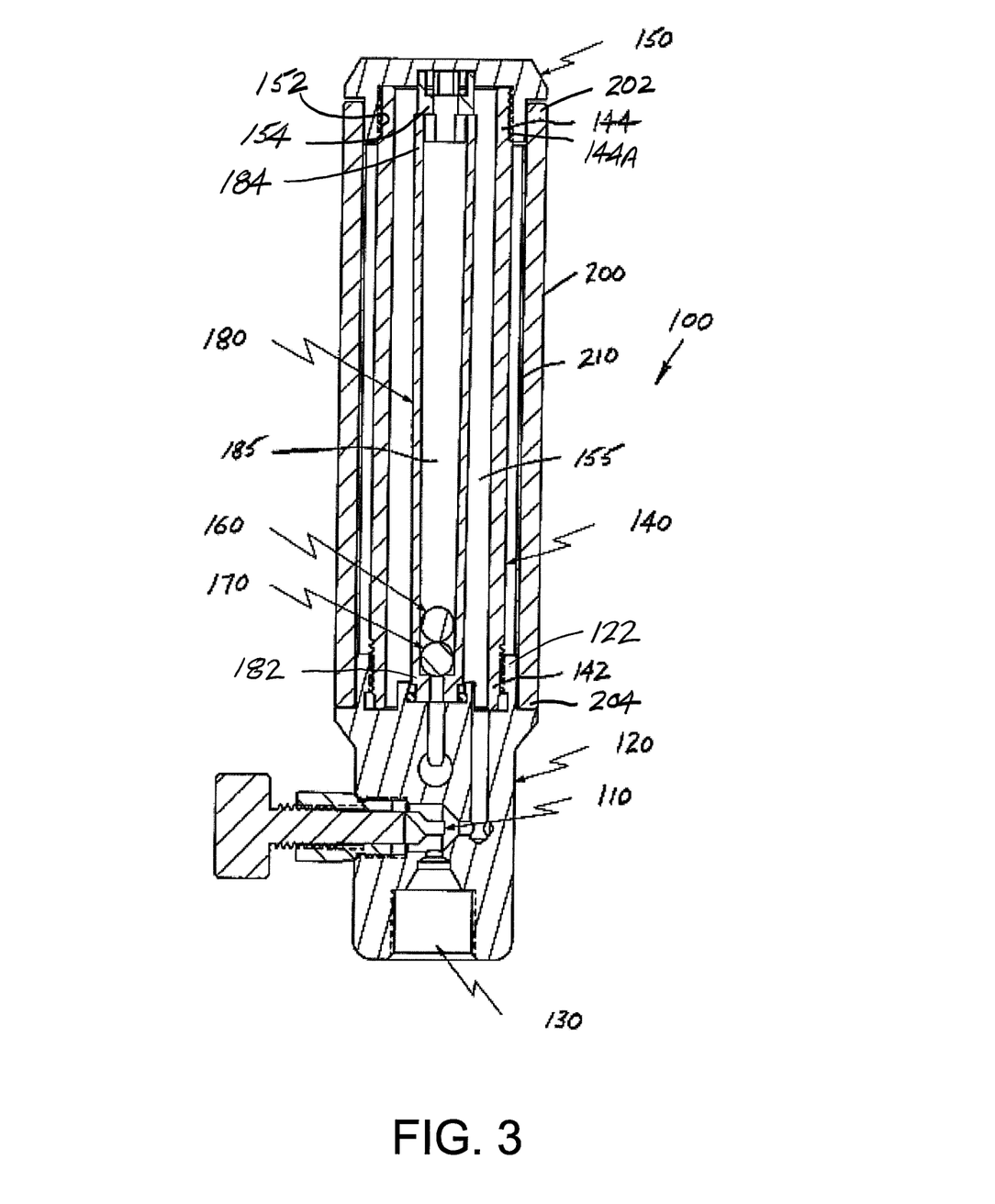
FIG. 3 is a cross-sectional view of the flowmeter assembly taken generally along the lines 3-3 of FIG. 2.
Figure 4:
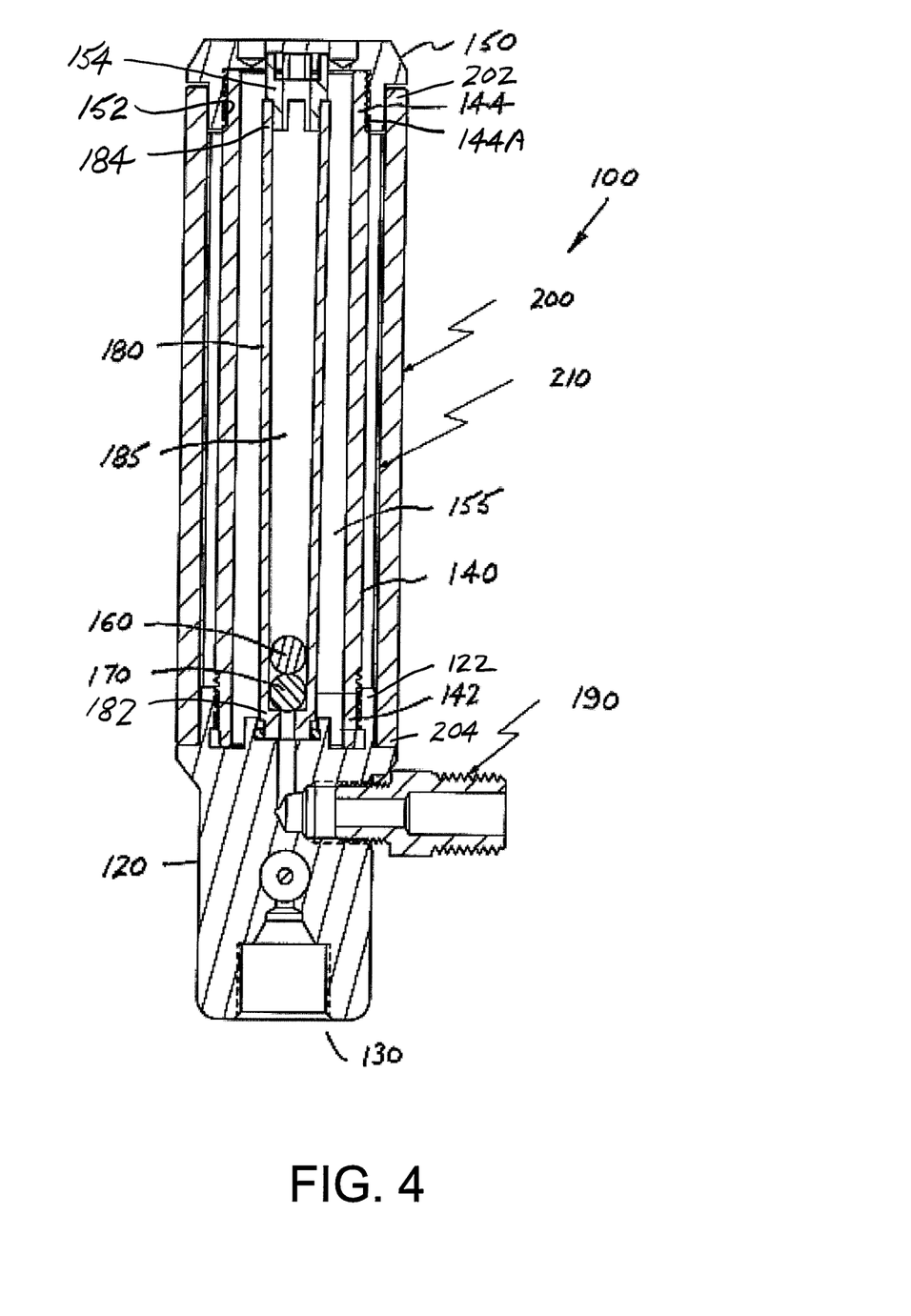
FIG. 4 is a cross-sectional view of the flowmeter assembly taken along the lines 4-4 of FIG. 2.
Figure 5A:
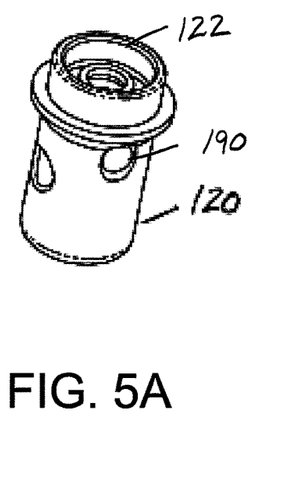
FIGS. 5A-5H are top perspective, bottom perspective, front elevational, rear elevational, first and second ends, and first and second cross-sectional views, respectively, of a flow meter body of the assembly.
Figure 5B:
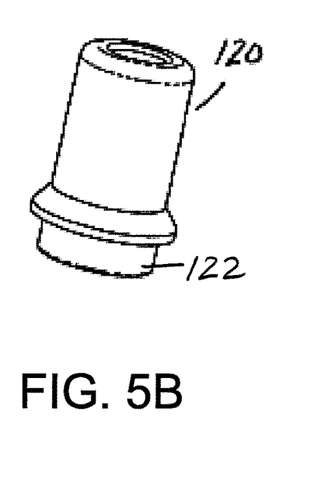
Figure 5C:
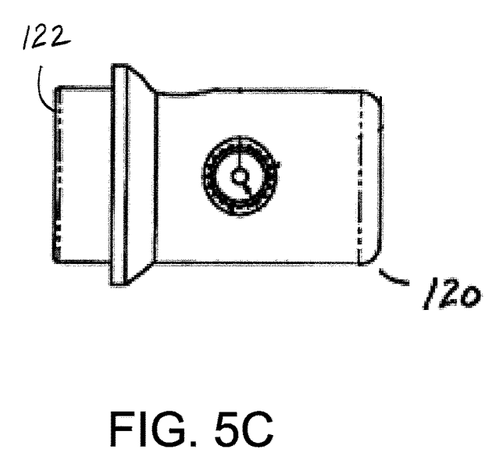
Figure 5D:
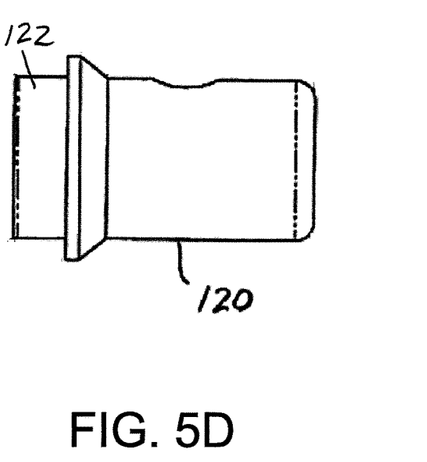
Figure 5E:
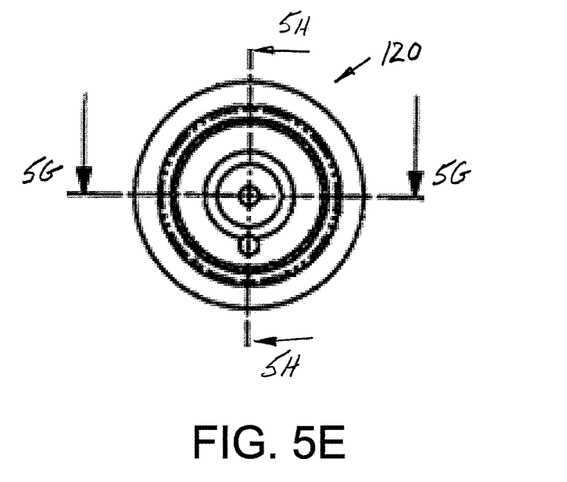
Figure 5F:
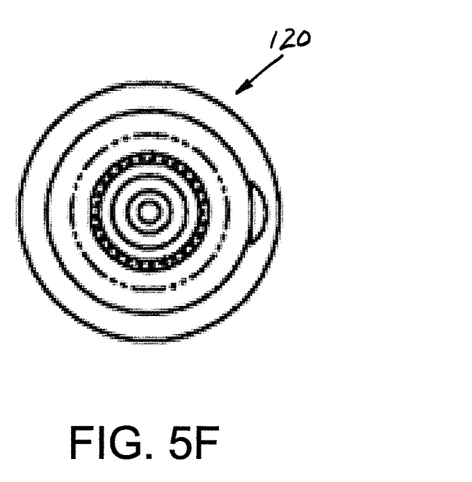
Figure 5G:
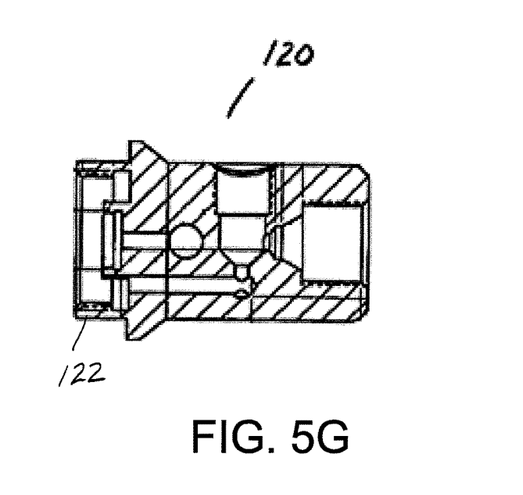
Figure 5H:
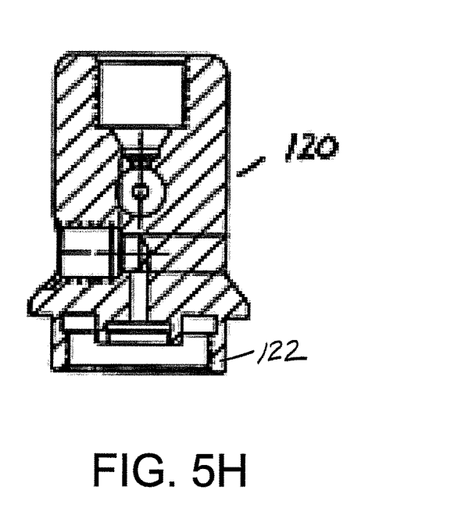
Figure 6A:
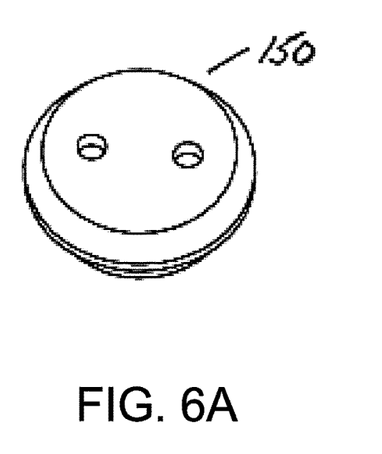
FIGS. 6A-6F are top perspective, bottom perspective, elevational, top, bottom, cross-sectional views, respectively, of a flow meter cap of the assembly.
Figure 6B:
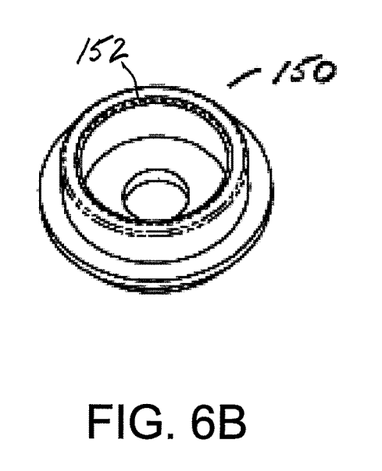
Figure 6C:
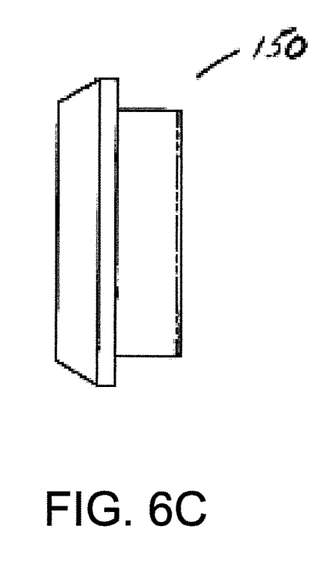
Figure 6D:
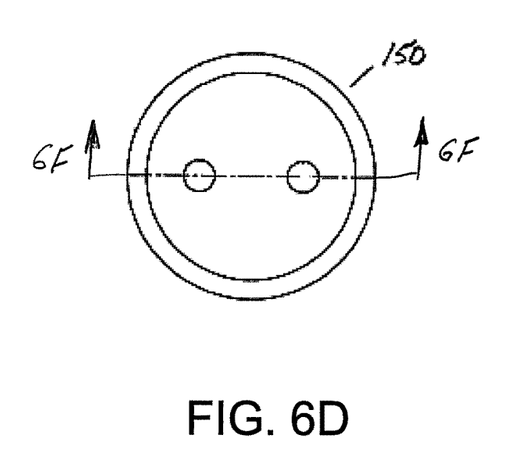
Figure 6E:
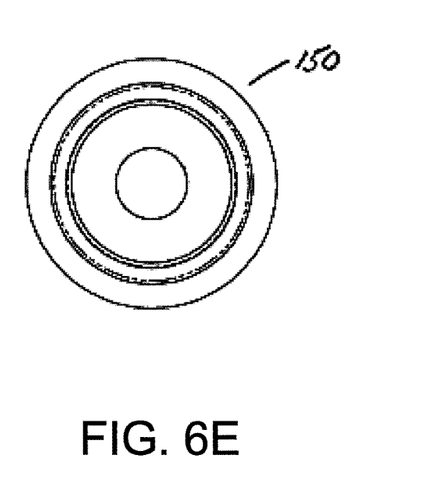
Figure 6F:
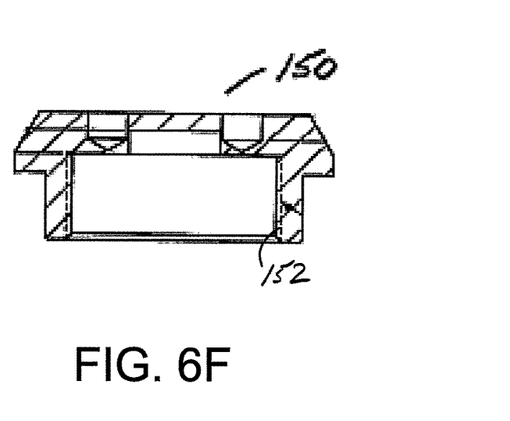
Figure 7A:
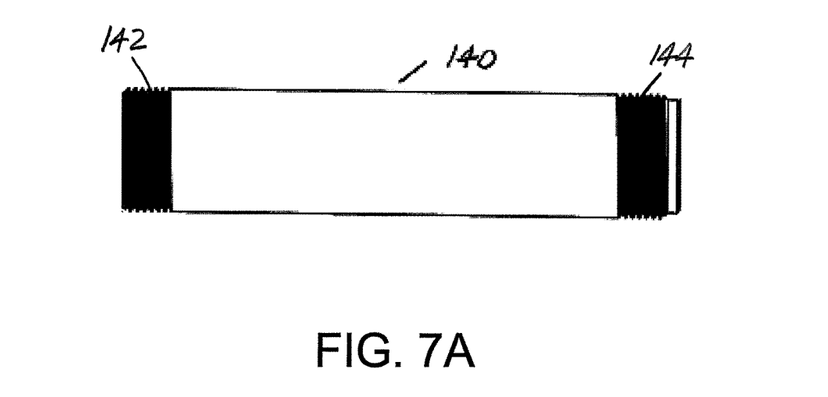
FIG. 7A-7C are elevation, end, and cross-sectional views, respectively, of a flow meter mount tube of the assembly.
Figure 7B:
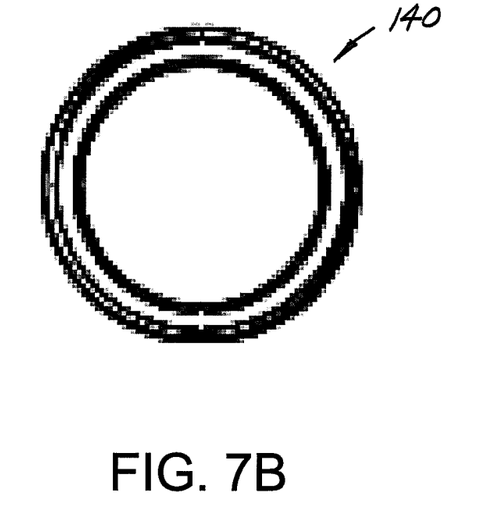
Figure 7C:
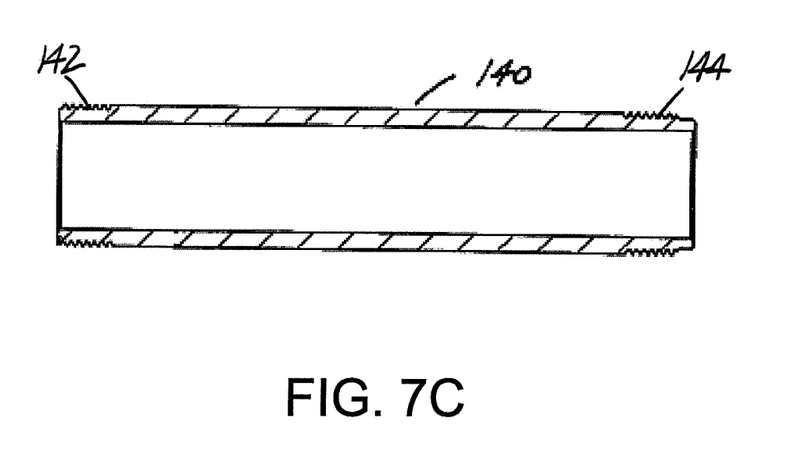
Figure 8A:
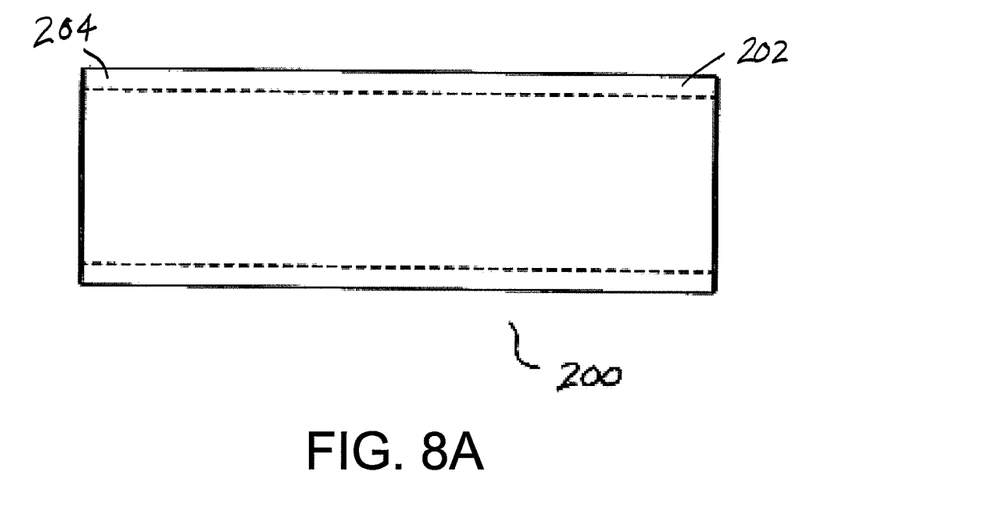
FIGS. 8A and 8B are side and end view, respectively, views of a flow meter outer tube of the assembly.
Figure 8B:
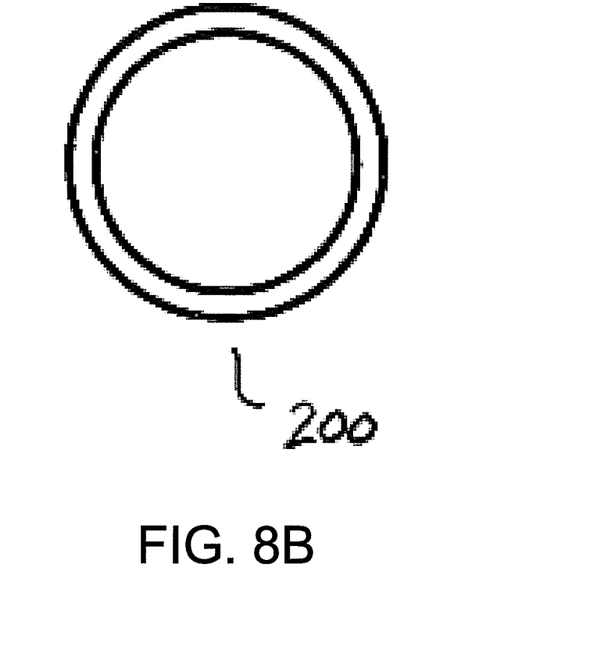

This invention shows a flowmeter assembly 100 (FIGS. 1-4) that uses a downstream variable orifice control valve 110 to control gas flow. The control valve 10 is typically mounted to the side of the flowmeter body 120 prior to the gas exit of the flowmeter 130. A clear or transparent tube 140 (FIG. 3), acrylic or similar material, is fixed at a first end 142 to the flowmeter body 120, for example, via cooperating threaded regions on a top portion 122 of the flowmeter body in the first end of the clear tube, respectively. A cap 150 is mounted to second end or top portion 144 of the clear tube 140, and secured thereto, for example, by cooperating threaded regions 152, 144A on the cap and top portion, respectively. The body 120, clear tube 140, and 150 form a pressure chamber 155 of the flowmeter assembly 100. In a center of the pressurized chamber 155 are two floats such as spherical floats 160, 170 inside a clear (transparent), tapered (shown as decreasing from top to bottom as seen in FIGS. 3 and 4), inner hollow member or rotameter tube 180. More particularly, the rotameter tube 180 forms a passage 185 sealed at its first, lower end 182 to the flowmeter body 120 and connected at its second, upper end 184 to the cap 150, specifically to a central portion 154 of the cap. The passage 185 of the rotameter tube 180 receives the floats 160, 170 therein. The top float 160 is preferably a first colored (e.g., white) polytetrafluoroethylene, or similar material, and the bottom float 170 is preferably a stainless steel, or similar material (e.g., silver), i.e. the floats are different densities, and/or formed of different materials having different densities, and are distinct, different colors. The bottom float 170 is formed of a material having a greater density than the top float 160. The rotameter tube 180 leads to and is in fluid communication with the gas inlet 190 (FIGS. 1-2), which is also mounted to the side of the flowmeter body 120 and preferably the gas inlet is at a location spaced from the control valve 110, shown here as being located at a circumferentially spaced location on the body from the control valve. The gas flows from the inlet into first end 182 of the inner hollow member/rotameter tube 180 where the flow lifts the floats 160, 170 depending on the gas flow rate through the rotameter tube. Since the upper float 160 is less dense, it will move more readily than the lower float 170, and at increased flows both floats may be lifted to a certain height in the rotameter tube 180 above the illustrated initial position (FIGS. 3-4) representative of no flow. Thus, the upper float 160 is more sensitive to low flow rates and less dense gases (e.g., helium) whereas the lower float 170 will move in response to higher flow rates and more dense gases (e.g., carbon dioxide, argon, or nitrogen). If the stainless steel lower float were used for helium, for example, the scale limits would be undesirable, and thus the reason that the upper float with the smaller specific gravity is used for less dense gases, and the second, lower float with the greater specific gravity is useful to measure gas flow for more dense gases such as carbon dioxide, argon, or nitrogen.

The gas flow continues to an upper, second end 184 of the inner hollow member/rotameter tube 180 at the cap 150, and the shielding gas flow proceeds toward or communicates with the interior of the transparent tube 140 which, in turn, communicates with the control valve 110 as the gas flow continues toward the outlet/exit 130.

Figure 9A:
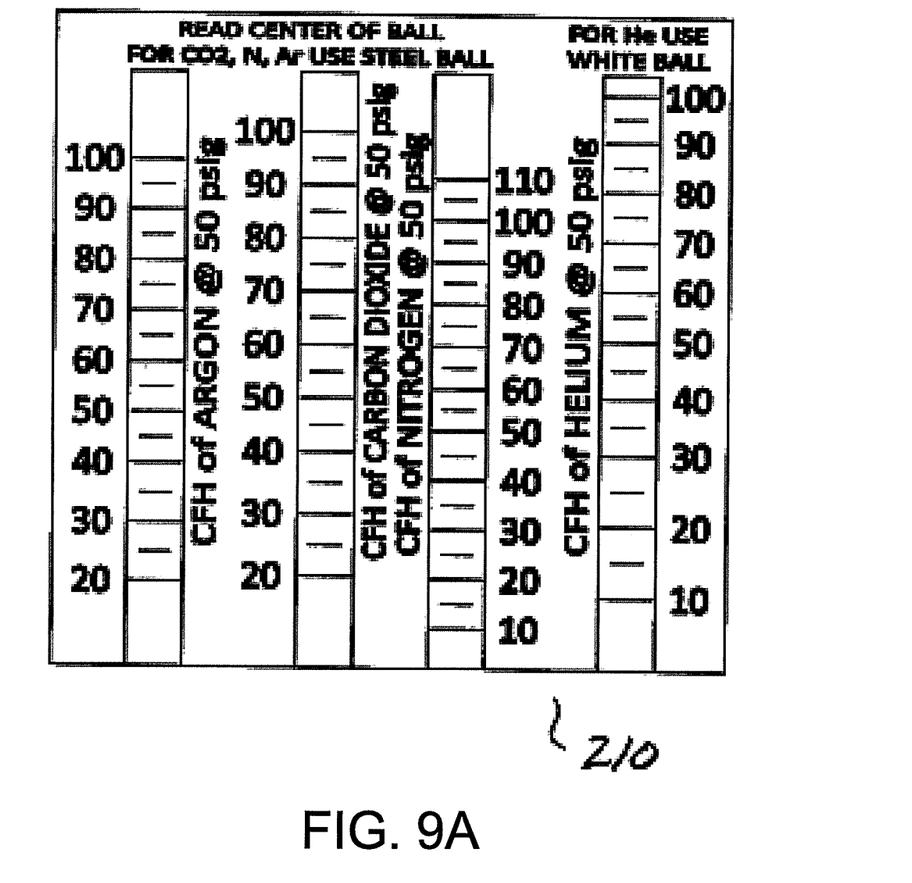
FIGS. 9A-9C include different views of a flow meter label of the assembly.

Outside of the pressurized chamber 155 is a clear (transparent), free rotating unpressurized tube or outer cover 200 (FIGS. 3-4). The cover 200 rotates relative to the cap 150 at its first, upper end 202 and likewise rotates relative to the body 120 at its second, lower end 204. The cover 200 has multiple scales 210 (FIGS. 3-4 and 9A) associated therewith to accommodate more accurate calibration of the particular shielding gas used in the welding process. For example, the scales 210 may be located on an inside diameter of this unpressurized tube/cover 200. By way of example, the printed scales 210 for multiple (e.g., four) gases (FIG. 9A) are provided. Therefore, since the scales 210 (FIGS. 3-4, and 9A) are secured or fixed to the inside diameter of the tube/cover 200, the scales can be selectively rotated via rotation of the tube/cover relative to the body 120 and cap 150 whereby the desired scale faces the operator for the necessary gas type flow reading. The thick outer cover 200 also provides protection for the pressurized inner tube 140 and pressurized inner hollow member/rotameter tube 180, as well as protecting the scale printing 210 from dirt and scratches.

Figure 9B:
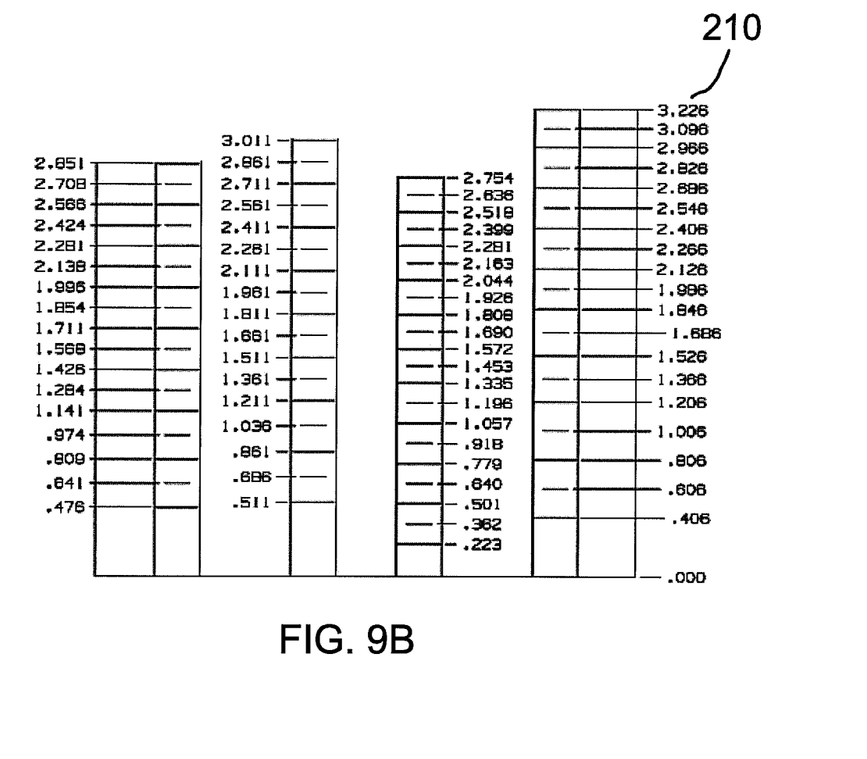
Figure 9C:
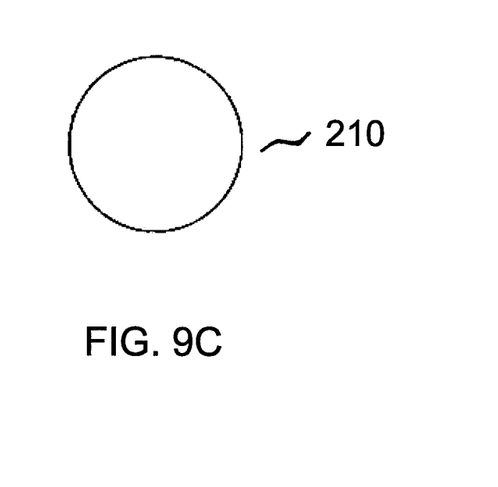

The scales 210 (FIG. 9A) are calibrated to read to the center of the floats 160, 170. When reading the flow rate of carbon dioxide, argon, or nitrogen the operator uses the stainless steel ball 170. When reading the flow rate of helium the operator uses the white ball 160. Different balls 160, 170 formed from different density material (material with different specific gravities) or different materials having different densities are used because the density of helium is significantly less than the other shielding gases. If the stainless steel ball 170 were used for helium, the scale limits 210 would be undesirable relative to the scales associated with the other shielding gases or combinations of shielding gases (e.g., special mixed inert gases such as 75% argon/25% carbon dioxide or 70% argon/30% helium could be used, although still other mixtures could be used without departing from the scope and intent of the present disclosure). Using a float or ball 160 with a smaller specific gravity provides an optimal scale size 210 for reading helium gas flow rate in typical welding applications. In addition, the scales 210 are nonlinear (see FIG. 9B) for greater accuracy. Some prior art manufacturers use linear scales that, as a result, are not accurate over the whole flow range. These linear scale manufacturers target a middle of the flow range in an attempt to provide the most accurate spot on the scale, but as the float moves away from that position, the amount of error likewise builds in either direction (up or down). Since the hollow member or rotameter tube 180, tube 140, and the cover 200 are all transparent, the operator is able to view the position of the first and second floats 160, 170 and determine the shielding gas flow rate by comparing the positions of the floats relative to the specific scale 210 on the inner diameter of the cover 200 to determine the flow rate, and make appropriate adjustments to the flow via the control valve 110.

Figure 10:
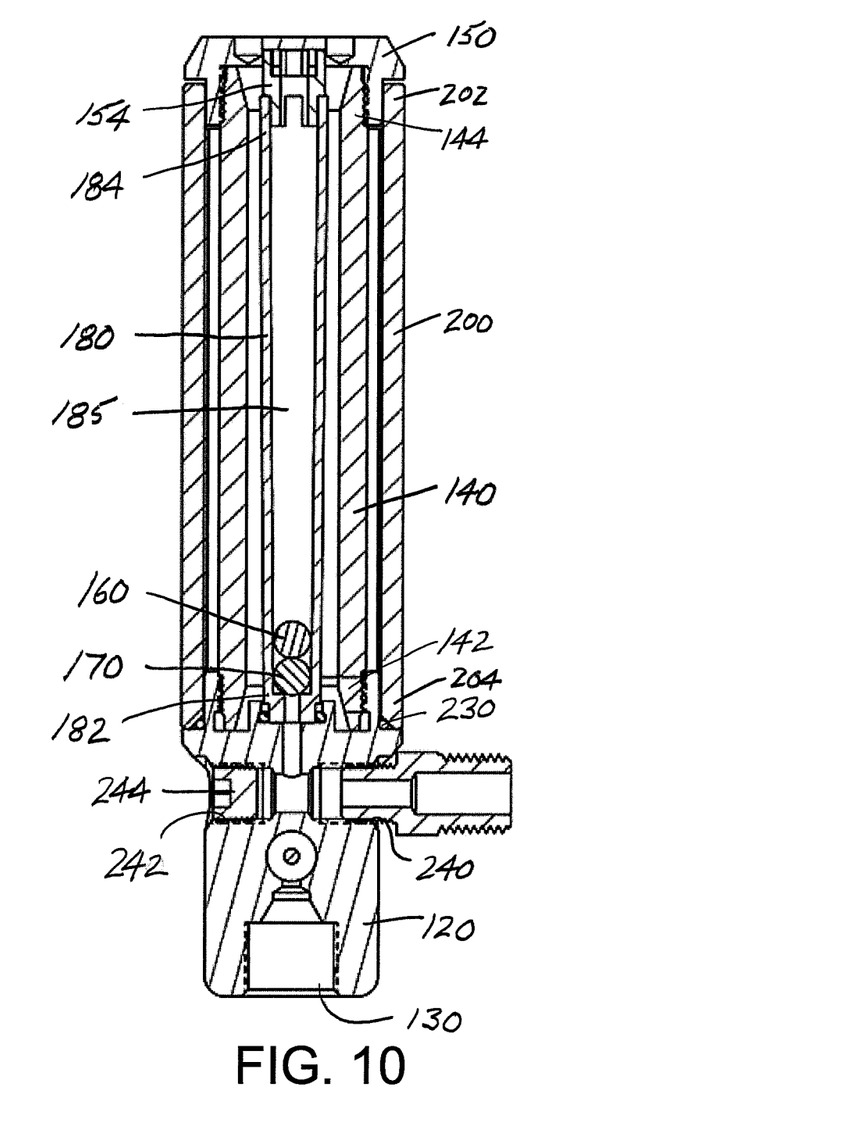
FIG. 10 is a longitudinal cross-sectional view of another embodiment of the flowmeter.

Two additional features are shown in FIG. 10. Specifically, a seal ring or o-ring 230 serves as a drag or friction member between the cover 200 and the flowmeter body 120. This stabilizes and holds the desired rotational position of the cover relative to the body once the operator has oriented the cover with the specific scale 210 as desired. Vibration or bumping of the cover 200 will not inadvertently move the scale 210 relative to the desired orientation relative to the body 120. Also in FIG. 10, the inlet may become a dual port inlet 240 in which suitable connection may be made with the shielding gas supply (not shown), and the second port 242 can receive a plug 244 since it will not be used. This allows the operator to locate the inlet at a desired location on the flowmeter 100.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

What is claimed is:

1. A gas flowmeter comprising:
a body having a transparent inner, rotameter tube sealed thereto that forms a pressurized passage that communicates with an inlet and an outlet for receiving gas flow therethrough;
a transparent, second tube that is secured and sealed at a first end to the body and has a second end that sealingly receives a cap, the transparent second tube coaxially receiving the rotameter tube therein to form a pressure chamber that also receives the gas flow therethrough;

a transparent unpressurized outer cover having first and second ends, the transparent outer cover coaxially received around both the rotameter tube and the transparent second tube, the transparent outer cover mounted for rotation relative to the body at the first end and relative to the cap at the second end;

a selectively variable valve that controls the gas flow to the outlet;

first, second, third, and fourth calibrated scales fixed to the outer cover and that represent a flow rate of one of at least first, second, third, and fourth different types or mixtures of gases, respectively, through the passage in the rotameter tube; and first and second floats having different material properties received in the passage of the rotameter tube and viewable through the transparent second tube and the outer cover in operative association with the calibrated scales, the first float having a first density operatively associated with the first calibrated scale to monitor gas flow of the first gas when the first gas flows into the body, and the second float having a second density greater than the first density of the first float and operatively associated with one of the second, third, and fourth calibrated scales to monitor gas flow of one of the second, third, and fourth different gases different than the first gas when one of the second, third, and fourth different gases flows into the body.

2. The gas flowmeter of claim 1 wherein the first and second floats have different colors so that an associated user can monitor the gas flow of the different types or mixtures of gases flowing through the passage via select ones of the calibrated scales.

3. The gas flowmeter of claim 1 wherein the calibrated scales are configured for selective display as selected by an associated user.

4. The gas flowmeter of claim 3 wherein the calibrated scales are provided on an inner surface of the outer cover mounted to the body and surrounding the passage.

5. The gas flowmeter of claim 4 further comprising a drag member that applies a predetermined friction force between the outer cover and the body.

6. The gas flowmeter of claim 1 wherein the calibrated scales are non-linear.

7. A method of forming a gas flowmeter comprising:
providing a body having a transparent inner, rotameter tube with a passage that communicates with an inlet and an outlet for receiving gas flow therethrough;
providing a transparent, second tube that is secured at a first end to the body and has a second end that receives a cap, the transparent second tube receiving the rotameter tube therein in a sealed relation to form a pressurized chamber, the transparent second tube also receiving the gas flow therethrough;
providing a transparent unpressurized outer cover received around the transparent second tube and that is configured for rotation relative to the rotameter tube, transparent second tube, cap, and body;
controlling the gas flow to the outlet with a valve; and
incorporating first, second, third, and fourth calibrated scales secured to an inner surface of the transparent outer cover to monitor flow rates of one of at least first, second, third, and fourth different types or mixtures of gases, respectively, through the passage; and
using first and second floats having different densities in the passage and viewable in operative association with the calibrated scales, the first float having a first density associated with the first calibrated scale to monitor gas flow of the first gas, and the second float having a second density greater than the first density where the second float is associated with one of the second, third, and fourth calibrated scales to monitor gas flow of one of the second, third, and fourth different gases.

8. A gas flowmeter comprising:
a body having a transparent inner, rotameter tube with a passage that communicates with an inlet and an outlet for receiving gas flow therethrough, the transparent rotameter tube received in a transparent, second tube that is sealed at a first end to the body and has a second end that sealingly receives a cap to form a pressurized chamber, and a transparent unpressurized outer cover received around the transparent second tube;
a selectively variable valve that controls the gas flow to the outlet; and
at least first, second, third, and fourth calibrated scales viewable through the transparent outer cover to represent a flow rate of one of first, second, third, and fourth different types or mixtures gases, respectively, through the passage, wherein the first, second, third, and fourth calibrated scales are located on the transparent outer cover and the transparent outer cover is mounted for rotation relative to the cap and body; and
first and second floats having different densities received in the passage and viewable in operative association with the calibrated scales, the first float operatively associated with the first calibrated scale to monitor gas flow of athe first gas, and the second float operatively associated with one of the second, third, and fourth scales to monitor gas flow of one of the second, third, and fourth different gases different than the first gas when one of the second, third, and fourth different gases flows through the body.

9. The gas flowmeter of claim 8 wherein the first and second floats have different colors so that an associated user can monitor the gas flow of the different types or mixtures of gases flowing through the passage via select ones of the calibrated scales.

10. The gas flowmeter of claim 8 wherein the calibrated scales are secured to an inner surface of the transparent cover.

* * * * *